June 24, 1969  D. R. MILLER  3,451,432

TEST PLUG MEANS FOR FLUID CONDUITS

Filed March 2, 1967

INVENTOR
Daniel R. Miller

Lawrence E. Laubscher
ATTORNEY

United States Patent Office 3,451,432
Patented June 24, 1969

3,451,432
TEST PLUG MEANS FOR FLUID CONDUITS
Daniel R. Miller, 9317 St. Andrews Place,
College Park, Md. 20740
Filed Mar. 2, 1967, Ser. No. 619,975
Int. Cl. F16l 55/10
U.S. Cl. 138—90          3 Claims

ABSTRACT OF THE DISCLOSURE

Test plug means for removably closing an access opening through which a measuring instrument may be inserted within a fluid conduit. In the preferred embodiment, the test plug means includes a synthetic plastic housing adapted for mounting across an opening contained in a conduit, and a plug removably mounted in a through bore in the housing to afford test access to the conduit, said housing having a frustoconical portion extending outwardly from the conduit opening to protect and attractively conceal a corresponding bevelled surface of the access opening contained in a layer of insulation that jackets the conduit.

Specification

This invention relates generally to improved test plug means for insulated and non-insulated fluid conduits, and more particularly to test plug means including a bored housing adapted to be secured across an access opening contained in the conduit wall, and plug means removably closing the passage through the bore and access openings, whereby upon removal of the test plug, a measuring instrument may be inserted within the conduit.

As evidenced by the patents to Clark No. 948,872 and Stroughton No. 1,690,183, it has been proposed in the patented prior art to provide test plug means removably connected with a fluid conduit for closing an access opening contained in a wall thereof. Upon removal of the test plug, suitable measuring instruments—such as a Pitot tube, a thermometer or the like—may be inserted within the duct for measuring the rate of flow or temperature of the fluid being conveyed.

In the case of relatively thin-walled sheet metal heating and/or air conditioning ducts commonly used in commercial, industrial and residential installations, it is difficult to securely connect a test plug to the conduit in a fluid-tight manner. Moreover, the plug means are often unsightly when applied to a permanently exposed duct and, in the case of a duct provided with a jacket layer of insulation, frequently result in damage to the exposed edge and wall portions of the insulation opening during repeated disconnection and connection of the plug. The present invention was developed to avoid the above and other drawbacks of the known test plug means.

Accordingly, the primary object of the present invention is to provide improved test plug means for fluid conduits and including a housing adapted to be secured across an access opening, said housing containing a through bore in communication with the access opening. Closure means including a plug and a seal gasket are provided for connection with the housing to close the bore passage. According to one embodiment of the invention, the plug is connected with the housing by screw thread means. In an alternative embodiment, the connection is achieved by pin and slot means.

A more specific object of the invention is to provide test plug means for use with a fluid conduit that is jacketed with a layer of insulation material, the test plug housing including an outwardly diverging truncated conical wall portion and an annular flange portion for protectively and decoratively lining the wall and edge surfaces of a beveled access opening that is formed in the insulation. In accordance with the preferred form of the invention, the test plug and the housing are formed—by molding or machining—from a suitable synthetic plastic material.

Other objects and advantages of the invention will become apparent from a study of the following specification, when considered in conjunction with the accompanying drawing, in which.

Figure 1:
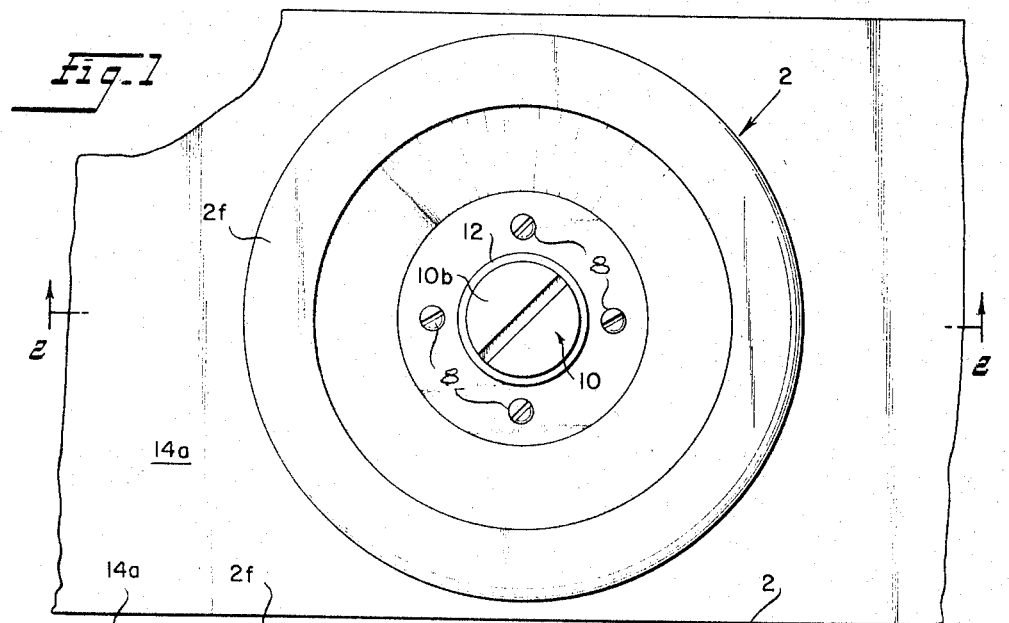
FIG. 1 is a top plan view of the test plug means of the present invention for closing the access opening of an insulation jacketed fluid conduit.
Figure 2:
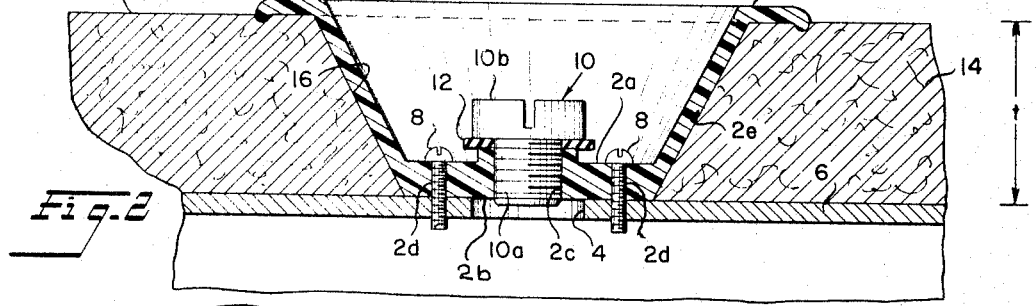
FIG. 2 is a sectional view taken along line 2—2 of FIG. 1.

Referring first to FIGS. 1 and 2, the test plug means of the present invention comprises a rigid housing 2 having a body portion 2a including a first surface 2b adapted for seating across an opening 4 contained in the wall of a fluid conduit 6 (for example, a sheet metal heating and/or air conditioning duct of rectangular cross-section). The body portion contains also a threaded through bore 2c normal to the first surface 2b and in communication with the opening 4, and a plurality of openings 2d for receiving screws 8 by means of which the housing 2 is secured to the conduit 6. The passage through bore 2c is closed by the threaded shank portion 10a of a screw plug 10, a resilient annular gasket 12 (of a suitable material such as rubber, a synthetic plastic material, or the like) being mounted concentrically on the shank portion 10a and compressed between the housing and an enlarged head portion 10b of the screw plug.

In the embodiment of FIGS. 1 and 2, the conduit is jacketed by layer of insulation 14 having a thickness $t$. The housing 2 includes also a truncated conical portion 2e that diverges outwardly in engagement with the wall surface of a correspondingly beveled opening 16 contained in the insulation layer 14 colinearly with the wall opening 4, and an annular flange portion 2f that extends radially outwardly from the free extremity of the conical portion 2e for engagement with the exposed surface 14a of the insulation layer 14. The distance betwen the flange portion 2f and the plane containing the first housing surface 2b is substantially equal to, but no greater than, the layer thickness $t$. While preferably the housing 2 and the plug 10 are formed (by molding or machining) from a suitable synthetic plastic material, it is apparent that either or both could be formed of metal if desired.

In order to insert a Pitot tube, thermometer or other measuring instrument within the duct 6 the plug 10b is merely unscrewed and removed together with the gasket 12, whereby the instrument is inserted via bore 2c and opening 4.

Figure 3:
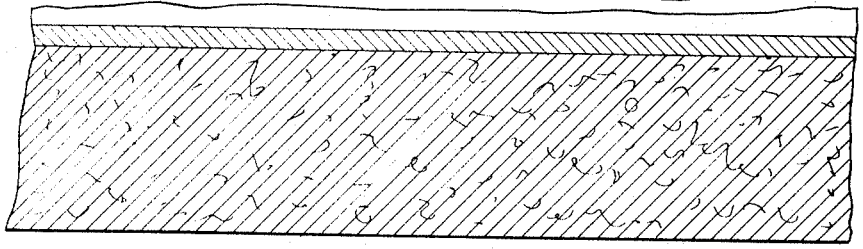
FIG. 3 is a sectional view of another plug embodiment as connected with a non-insulated fluid conduit.
Figure 4:
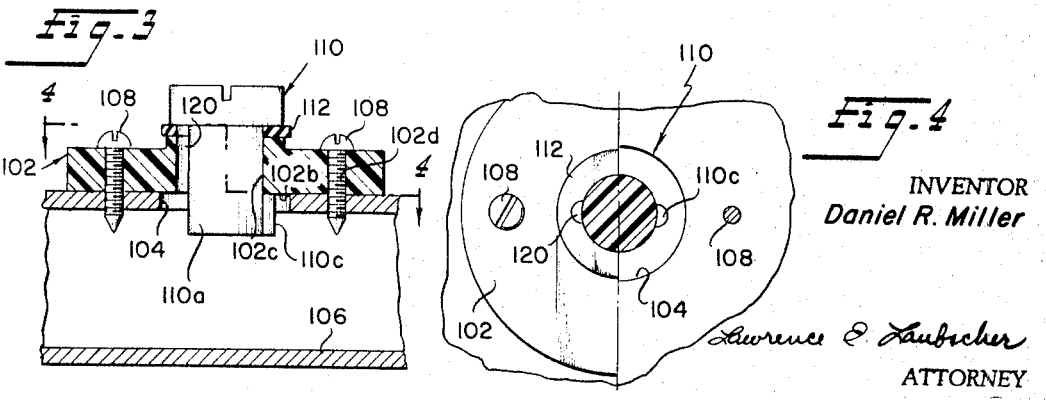
FIG. 4 is a sectional view taken along line 4—4 of FIG. 3.

Referring now to the embodiment of FIGS. 3 and 4, the plug 110 is secured within bore 102c of housing 102 by means of the shank projection 110c that extends laterally beneath and in locking engagement with the housing first surface 102b, thereby compressing gasket 112. Slot 120 contained in the wall of bore 102c is adapted to slidably receive the projection 110c (when the plug is rotated 180 degrees from the illustrated position) to permit removal of the plug for insertion of a measuring instrument within conduit 106. As distinguished from the embodiment of FIG. 1, the housing of FIG. 3 is adapted for mounting across an opening 104 contained in a non-insulated conduit 106, whereby the provision of the truncated conical portion and the flange portion is omitted. It is apparent that by appropriate modification, the plug fastening means of FIG. 3 could be substituted for screw thread means of FIG. 1, and vice versa.

While in accordance with the provisions of the patent statutes the preferred forms and embodiments of the invention have been illustrated and described, it will be apparent to those skilled in the art that various changes may be made in the apparatus without deviating from the invention.

What is claimed is:

1. Test plug means for closing an access opening contained in the wall of a fluid conduit externally jacketed with a layer of insulation, comprising a housing adapted for mounting upon the external surface of the conduit wall across said opening, said housing including a body portion adapted for contiguous engagement with the conduit wall and containing a through bore communicating at one end with said conduit opening, said housing including also a truncated conical portion coaxially arranged relative to said bore and diverging outwardly from the opposite side of said housing, whereby when the jacket insulation contains a bevelled opening having the same pitch as the truncated conical portion and in alignment with the wall opening, the conical portion of the housing covers the bevelled wall portion of the insulation opening;

closure means closing the bore comprising a plug having shank and enlarged head portions, said shank portion extending from said head portion into the bore, and an annular gasket mounted concentrically on said shank portion;

and means removably connecting said plug with said housing to compress the gasket between said enlarged head portion and said housing, thereby affording a fluid-tight seal for the conduit opening.

2. Test plug means as defined in claim 1 wherein said plug is formed of a synthetic plastic material.

3. Test plug means as defined in claim 1, and further wherein said housing includes an annular protective flange portion extending outwardly from the free extremity of said truncated conical portion in a plane parallel with that of said body portion, whereby said flange portion engages the exterior surface of the insulation adjacent the insulation opening.

References Cited

UNITED STATES PATENTS

| | | | |
|---|---|---|---|
| 1,083,024 | 12/1913 | Morris | 138—92 |
| 1,690,183 | 11/1928 | Stoughton | 138—90 |
| 2,071,532 | 2/1937 | Hyman | 138—92 |
| 2,207,301 | 7/1940 | Robinson | 138—92 XR |
| 2,636,514 | 4/1953 | Woodward | 138—90 XR |

FOREIGN PATENTS

| | | |
|---|---|---|
| 93,310 | 6/1923 | Austria. |
| 662,847 | 5/1963 | Canada. |
| 92,782 | 7/1938 | Sweden. |

ROBERT R. MACKEY, *Primary Examiner.*

U.S. Cl. X.R.

138—92